(12) United States Patent
Zagorski

(10) Patent No.: US 8,694,222 B2
(45) Date of Patent: Apr. 8, 2014

(54) COLLISION AVOIDANCE SYSTEM AND METHOD OF OPERATING THE SAME

(75) Inventor: Chad T. Zagorski, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 99 days.

(21) Appl. No.: 13/281,667

(22) Filed: Oct. 26, 2011

(65) Prior Publication Data

US 2013/0110368 A1 May 2, 2013

(51) Int. Cl.
*B60T 8/32* (2006.01)

(52) U.S. Cl.
USPC .............................................. 701/70; 701/93

(58) Field of Classification Search
USPC ....................................................... 701/70, 93
See application file for complete search history.

(56) References Cited

U.S. PATENT DOCUMENTS

| | | | | |
|---|---|---|---|---|
| 6,084,508 | A * | 7/2000 | Mai et al. ........................ | 340/463 |
| 6,517,172 | B1 * | 2/2003 | Tellis et al. ..................... | 303/193 |
| 6,658,336 | B2 | 12/2003 | Browne et al. | |
| 6,889,140 | B2 * | 5/2005 | Isogai et al. ................... | 701/301 |
| 7,418,345 | B2 * | 8/2008 | Diebold et al. ................ | 701/301 |
| 7,562,948 | B2 * | 7/2009 | Matsumoto et al. ........... | 303/146 |
| 7,565,242 | B2 * | 7/2009 | Lucas et al. .................... | 701/301 |
| 7,647,178 | B2 * | 1/2010 | Ekmark et al. ................. | 701/301 |
| 7,719,410 | B2 | 5/2010 | Labuhn et al. | |
| 7,866,427 | B2 * | 1/2011 | Zagorski ........................ | 180/167 |
| 7,916,006 | B2 | 3/2011 | Chatterjee et al. | |
| 7,979,174 | B2 * | 7/2011 | Fregene et al. ................. | 701/23 |
| 8,019,509 | B2 * | 9/2011 | Bernzen et al. ................ | 701/45 |
| 8,150,583 | B2 * | 4/2012 | Danner et al. .................. | 701/45 |
| 2007/0032952 | A1 * | 2/2007 | Carlstedt et al. .............. | 701/301 |
| 2009/0319112 | A1 * | 12/2009 | Fregene et al. ................. | 701/25 |
| 2010/0094509 | A1 * | 4/2010 | Luke et al. ..................... | 701/45 |
| 2010/0094520 | A1 | 4/2010 | Zagorski | |
| 2011/0156891 | A1 | 6/2011 | Chatterjee et al. | |

\* cited by examiner

*Primary Examiner* — Mary Cheung
*Assistant Examiner* — Michael Berns
(74) *Attorney, Agent, or Firm* — Lionel D. Anderson; Reising Ethington P.C.

(57) ABSTRACT

A collision avoidance system and method that may be used to prevent, avoid and/or mitigate a collision between a host vehicle and a target vehicle by engaging in autonomous braking once an imminent crash is detected. Unlike other methods that are only capable of autonomous braking according to predetermined and static brake commands, the present method may use dynamic brake commands throughout an autonomous braking event so that the deceleration of the host vehicle can be continuously adjusted such that it concludes at a reasonable distance away from the target vehicle. According to one example, the collision avoidance system maintains a relative distance ($\Delta d$) and/or a relative velocity ($\Delta v$) between the host and target vehicles during the autonomous braking event.

16 Claims, 3 Drawing Sheets

COLLISION AVOIDANCE SYSTEM AND METHOD OF OPERATING THE SAME

FIELD

The present invention generally relates to vehicle systems and, more particularly, to collision avoidance systems that automatically engage the vehicle brakes without driver intervention for purposes of collision avoidance and/or mitigation.

BACKGROUND

Some vehicle systems now engage in automatic or autonomous braking (i.e., without driver intervention) when an imminent collision is detected so that the impact may be avoided or its severity minimized. If the vehicle system automatically engages the brakes according to a constant and predetermined brake setting, however, then it can result in an overly conservative braking event where the vehicle stops well short of a target vehicle in front or the vehicle is decelerated to a much slower velocity than that of the target vehicle. In either case, the overly conservative automatic response of the vehicle system may be undesirable, as it can potentially subject the vehicle to a rear end crash by a trailing vehicle or to some other unwanted situation.

SUMMARY

According to one embodiment, there is provided a method for use with a collision avoidance system installed on a host vehicle. The method may comprise the steps of: (a) receiving target readings from a target sensor installed on the host vehicle; (b) using the target readings to determine if the host vehicle is likely to collide with a target vehicle; and (c) if the host vehicle is likely to collide with the target vehicle, then engaging in an autonomous braking event that includes adjusting or modifying dynamic brake commands throughout the autonomous braking event.

According to another embodiment, there is provided a method for use with a collision avoidance system installed on a host vehicle. The method may comprise the steps of: (a) receiving target readings from a target sensor installed on the host vehicle; (b) using the target readings to determine a deceleration avoidance value ($a_{AVOID}$) that is generally representative of a deceleration needed to prevent a collision between the host and target vehicles; and (c) using the deceleration avoidance value ($a_{AVOID}$) to generate dynamic brake commands that adjust or modify a deceleration of the host vehicle throughout an autonomous braking event.

According to another embodiment, there is provided a collision avoidance system installed on a host vehicle. The system may comprise: a target sensor, one or more braking device(s), and a control module coupled to the target sensor and to the braking device(s). The control module can be configured to provide dynamic command signals to the braking device(s) so that the deceleration of the host vehicle is adjusted or modified throughout an autonomous braking event.

DRAWINGS

Preferred exemplary embodiments will hereinafter be described in conjunction with the appended drawings, wherein like designations denote like elements, and wherein.

DESCRIPTION

The collision avoidance system and method described herein may be used to prevent, avoid and/or mitigate a collision between a host vehicle and a target vehicle by engaging in autonomous braking once an imminent crash is detected. Unlike other methods that are only capable of autonomous braking according to predetermined static brake commands, the present method uses dynamic brake commands that may be adjusted or modified during the autonomous braking event in order to take into account changing conditions (e.g., unusually high road surface friction or brake performance, sudden acceleration by the leading or target vehicle, etc.). This, in turn, may prevent the host vehicle from stopping well short of the target vehicle or from slowing down to a significantly slower velocity than that of the target vehicle; either of which can potentially result in the host vehicle being subject to a rear end crash by a trailing vehicle or some other undesirable situation.

Figure 1:
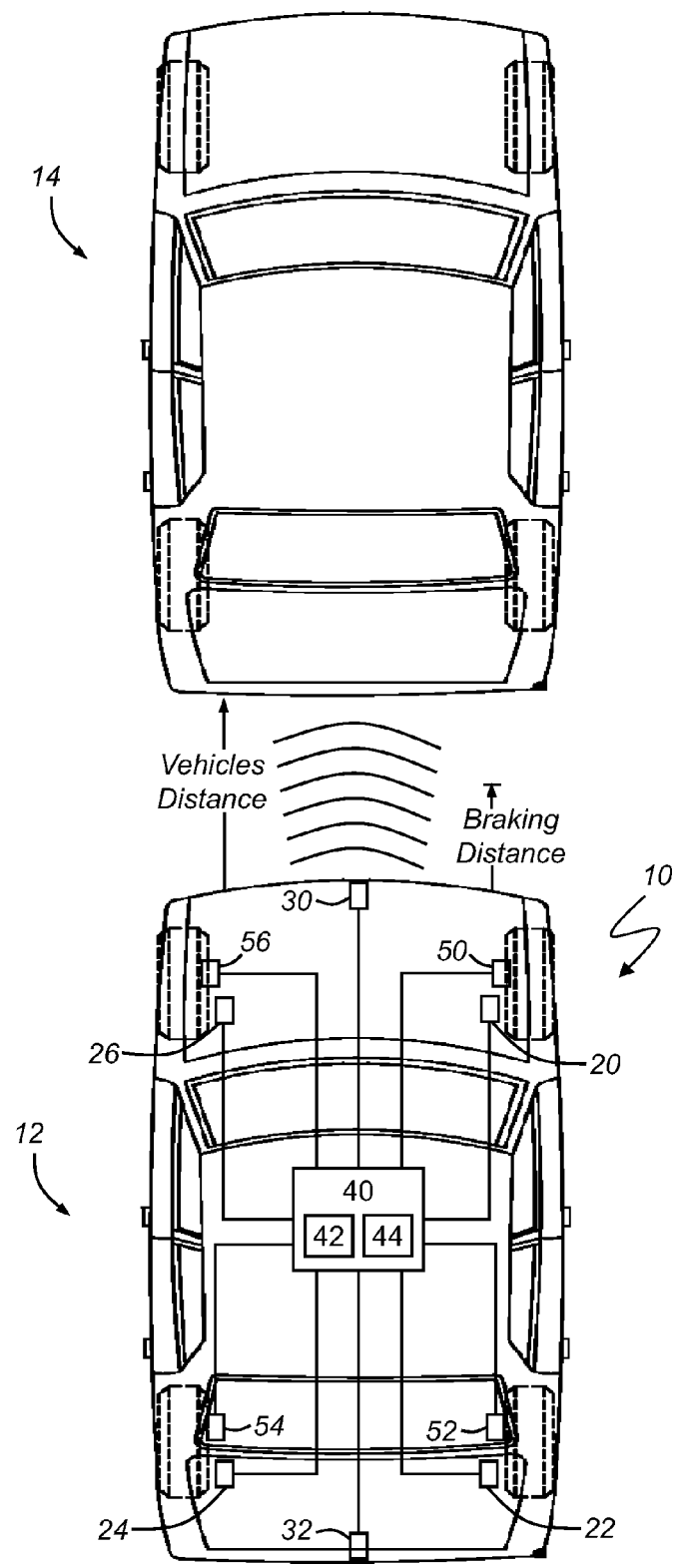
FIG. 1 is a schematic view illustrating a host vehicle having an exemplary collision avoidance system and a target vehicle.

With reference to FIG. 1, there is shown a general and schematic view of an exemplary collision avoidance system 10 that is installed on a host vehicle 12 and may be used to avert or minimize a collision with a target vehicle 14. It should be appreciated that the present system and method may be used with any type of vehicle, including traditional vehicles, hybrid electric vehicles (HEVs), extended-range electric vehicles (EREVs), battery electrical vehicles (BEVs), motorcycles, passenger vehicles, sports utility vehicles (SUVs), cross-over vehicles, trucks, vans, buses, recreational vehicles (RVs), etc. These are merely some of the possible applications, as the system and method described herein are not limited to the exemplary embodiments shown in FIGS. 1-3 and may be implemented in any number of different ways. According to one example, collision avoidance system 10 includes vehicle sensors 20-26, target sensors 30-32, a control module 40, and one or more braking devices 50-56.

Any number of different sensors, devices, modules and/or systems may provide collision avoidance system 10 with information or input that can be used by the present method. These include, for example, the exemplary sensors shown in FIG. 1, as well as other sensors that are known in the art but are not shown here. It should be appreciated that vehicle sensors 20-26, target sensors 30-32, as well as any other sensor utilized by collision avoidance system 10 may be embodied in hardware, software, firmware or some combination thereof. These sensors may directly sense or measure the conditions for which they are provided, or they may indirectly evaluate such conditions based on information provided by other sensors, devices, modules, systems, etc. Furthermore, these sensors may be directly coupled to control module 40, indirectly coupled to the control module via other electronic devices (e.g., a vehicle communications bus, network, etc.), or coupled according to some other arrangement known in the art. These sensors may be integrated within another vehicle device, module, system, etc. (e.g., sensors integrated within an engine control module (ECM), traction control system (TCS), electronic stability control (ESC) system, antilock brake system (ABS), etc.), they may be stand-alone components (as schematically shown in FIG. 1), or they may be provided according to some other arrangement. It is possible for any of the various sensor readings described below to be provided by some other device, module, system, etc. in vehicle 12 instead of being directly provided by an actual sensor element. In some instances, multiple sensors may be employed to sense a single parameter (e.g., for providing redundancy, security, etc.). It should be appreciated that the foregoing scenarios represent only some of the possibilities, as any type of suitable sensor arrangement may be used by collision avoidance system 10. That system is not limited to any particular sensor or sensor arrangement.

Vehicle sensors 20-26 may provide collision avoidance system 10 with a variety of vehicle readings and/or other information that can be used by the present method. In one embodiment, vehicle sensors 20-26 generate vehicle readings that are representative of the position, velocity and/or acceleration of host vehicle 12. Some examples of such readings include a host vehicle velocity reading ($v_{HOST}$) and a host vehicle acceleration reading ($a_{HOST}$). Vehicle sensors 20-26 may utilize a variety of different sensors and sensing techniques, including those that use rotational wheel speed, ground speed, accelerator pedal position, gear shifter selection, accelerometers, engine speed, engine output, and throttle valve position, to name a few. In the example shown in FIG. 1, individual wheel speed sensors 20-26 are coupled to each of the host vehicle's four wheels and separately report the rotational velocity of the four wheels. Skilled artisans will appreciate that these sensors may operate according to optical, electromagnetic or other technologies, and that other vehicle readings may be derived or calculated from the output of these sensors, such as vehicle acceleration. In another embodiment, vehicle sensors 20-26 determine vehicle speed relative to the ground by directing radar, laser and/or other signals towards the ground and analyzing the reflected signals, or by employing feedback from a Global Positioning System (GPS). As mentioned above, vehicle sensors 20-26 may be part of some other device, module, system, etc., like an anti-lock braking system (ABS).

Target sensors 30-32 provide collision avoidance system 10 with a variety of target readings and/or other information that can be used by the present method. In one example, target sensors 30-32 generate target readings that are representative of the position, velocity and/or acceleration of target vehicle 14. These readings may be absolute in nature (e.g., a target vehicle velocity reading ($v_{TAR}$) or a target vehicle acceleration reading ($a_{TAR}$)) or they may be relative in nature (e.g., a relative velocity reading ($\Delta v$) which is the difference between target and host vehicle velocities, or a relative acceleration reading ($\Delta a$) which is the difference between target and host vehicle accelerations). According to one example, target sensor 30 provides collision avoidance system 10 with the following inputs: a relative velocity reading ($\Delta v$), an actual target vehicle acceleration reading ($a_{TAR}$), and a relative distance reading ($\Delta d$) which is the range or distance between the target and host vehicles. Each target sensor 30, 32 may be a single sensor or a combination of sensors, and may include a light detection and ranging (LIDAR) device, a radio detection and ranging (RADAR) device, a vision device (e.g., camera, etc.), a vehicle-vehicle communications device, or a combination thereof. According to an exemplary embodiment, target sensor 30 includes a forward-looking long-range RADAR or LIDAR device that is mounted on the front of the vehicle, such as at the front bumper or behind the vehicle grille, and target sensor 32 includes a rearward-looking RADAR or LIDAR device that is mounted on the rear of the vehicle, such as at the rear bumper or in the rear window. A camera or other vision device could be used in conjunction with such sensors. It is possible for collision avoidance system 10 to only include a front or forward-looking target sensor 30 such that the system is only a front prevention system, as opposed to being both a front and rear prevention system. Collision avoidance system 10 is not limited to any particular type of sensor or sensor arrangement, specific technique for gathering or processing sensor readings, or particular method for providing sensor readings, as the embodiments described herein are simply meant to be exemplary.

Control module 40 may include any variety of electronic processing devices, memory devices, input/output (I/O) devices, and/or other known components, and may perform various control and/or communication related functions. In an exemplary embodiment, control module 40 includes an electronic memory device 42 that stores various sensor readings (e.g., vehicle and target readings from sensors 20-26 and 30-32), look up tables or other data structures, algorithms (e.g., the algorithm described below), etc. Memory device 42 may also store pertinent characteristics and background information pertaining to vehicle 12, such as information relating to stopping distances, deceleration limits, temperature limits, moisture or precipitation limits, driving habits or other driver behavioral data, etc. Control module 40 may also include an electronic processing device 44 (e.g., a microprocessor, a microcontroller, an application specific integrated circuit (ASIC), etc.) that executes instructions for software, firmware, programs, algorithms, scripts, etc. that are stored in memory device 42 and may govern the processes and methods described herein. Control module 40 may be electronically connected to other vehicle devices, modules and systems via suitable vehicle communications and can interact with them when required. These are, of course, only some of the possible arrangements, functions and capabilities of control module 40, as other embodiments could also be used.

Depending on the particular embodiment, control module 40 may be a stand-alone vehicle electronic module (e.g., an object detection controller, a safety controller, etc.), it may be incorporated or included within another vehicle electronic module (e.g., an integrated controller within the unit that includes the target sensors, a park assist control module, electronic brake control module (EBCM), etc.), or it may be part of a larger network or system (e.g., an active safety system, a traction control system (TCS), electronic stability control (ESC) system, antilock brake system (ABS), driver assistance system, adaptive cruise control system, lane departure warning system, etc.), to name a few possibilities. Control module 40 is not limited to any one particular embodiment or arrangement.

Braking devices 50-56 may be a part of any suitable vehicle brake system, including systems associated with disc brakes, drum brakes, electro-hydraulic braking, electro-mechanical braking, regenerative braking, brake-by-wire, etc. In an exemplary embodiment, braking devices 50-56 are disc brakes and each generally includes a rotor, a caliper, a piston, and brake pads (not shown) and may be part of an electro-hydraulic braking (EHB) system. As is appreciated by skilled artisans, a tire-wheel assembly (not shown) is attached to a hub with several lug nuts so that the tire, wheel, hub, and rotor can all co-rotate together. A brake caliper straddles the rotor and carries a brake piston so that a compressive and frictional brake force can be applied by brake pads to opposing sides of the rotor during a braking event. The frictional brake forces slow the rotation of the rotor and hence the rotation of the tire-wheel assembly and ultimately the vehicle. The brake pistons for each of the different wheels or corners may be: all controlled in unison, controlled on a wheel-by-wheel basis, controlled in groups (e.g., the front wheels are controlled separately from the rear wheels), or controlled according to some other known method. Again, it should be appreciated that the preceding description of braking devices 50-56 is only provided for purposes of illustration. The method described herein may be used with any number of different braking devices including those found in electro-mechanical braking systems (EMB) or other brake-by-wire systems. For instance, braking devices 50-56 could be substituted with other suitable components, such as electro-mechanical brakes having electric calipers (e-calipers), drum brakes, and hybrid vehicle brakes that use regenerative braking.

In one embodiment, control module 40 generates one or more brake commands that are used to control brake devices 50-56. For instance, control module 40 may generate brake commands that are provided to a hydraulic unit and used to control one or more actuator(s), such as boost, isolation and/or dump valves. These valves can control the fluid pressure in hydraulic lines which lead to the front and/or rear wheels. By controlling the fluid pressure in the hydraulic lines, control module 40 is able to control the brake force and ultimately the brake torque exerted by disc brake devices 50-56. Other examples and implementations of braking devices 50-56 are certainly possible.

Figure 2:
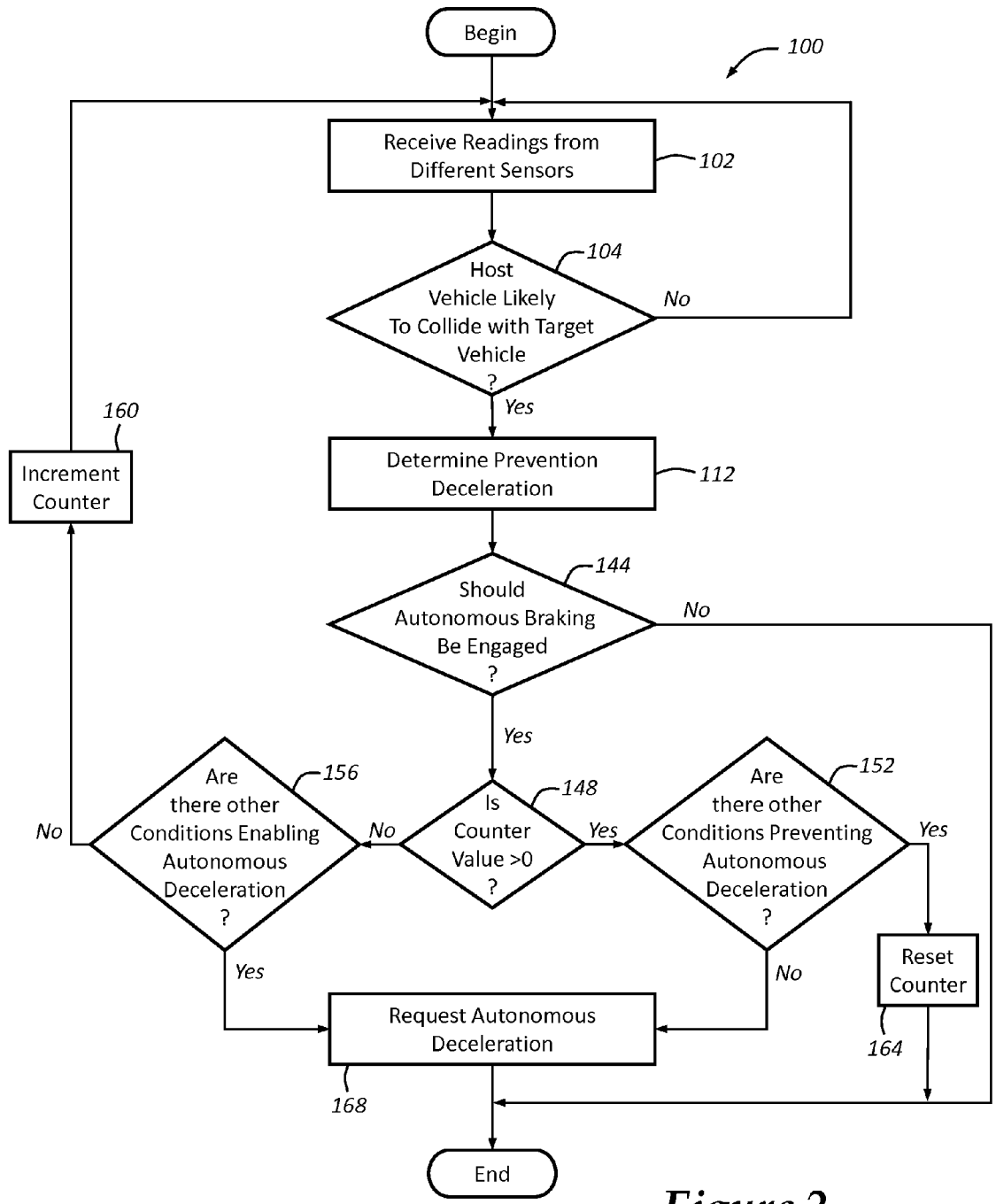
FIG. 2 is a flowchart illustrating an exemplary method for use with a collision avoidance system, such as the system shown in FIG. 1.

Turning now to FIG. 2, there is shown an exemplary method 100 that may be used with collision avoidance system 10 to detect an impending collision and to engage in an autonomous braking event in order to avert or minimize the effects of such a collision. According to an exemplary embodiment, method 100 uses readings from one or more vehicle and/or target sensors to generate dynamic brake commands that automatically control the braking devices throughout the autonomous braking event so that the relative distance (Δd), the relative velocity (Δv) and/or some other braking parameter can be controlled. This method, or at least portions thereof, may be performed automatically or autonomously without intervention by the driver.

Beginning with step 102, the method receives vehicle readings from vehicle sensors 20-26 and target readings from target sensors 30-32 and may do so in a variety of ways. For instance, control module 40 may receive and/or derive a host vehicle velocity reading ($v_{HOST}$) from vehicle sensors 20-26, as well as a target vehicle acceleration value ($a_{TAR}$), a relative velocity reading (Δv), and a relative distance reading or range (Δd) from target sensor 30. It is also possible for the vehicle and/or target readings to be provided by other controllers, devices, modules and/or systems located around host vehicle 12. These readings can shed light on the current conditions affecting the host and target vehicles, and they may be calculated or otherwise processed by a controller co-located at the sensors or by control module 40, to cite two possibilities. According to one example, step 102 gathers target readings from a RADAR, LIDAR and/or camera device on a periodic basis (e.g., every 40 mS or so).

Next, step 104 determines if the host vehicle is going to collide with the target vehicle. If the target readings from target sensor 30 indicate that there is no target vehicle 14 in front of host vehicle 12 or that a collision is not likely, then the method simply loops back to step 102 for continued monitoring as there is presently no need to engage in an autonomous braking event. If, however, a target vehicle 14 is detected in front of host vehicle 12 and a collision between the host and target vehicles according to their current paths or trajectories is likely or expected, then the method proceeds to step 112 so that an appropriate braking response can be evaluated and potentially developed. Just because a collision between the two vehicles is currently likely does not necessarily mean that the method will automatically engage in an autonomous braking event. If, for example, there is plenty of stopping distance for the driver of the host vehicle to avoid a collision, then it may be preferable to refrain from autonomous braking and to give the driver an opportunity to manually avert the collision. Considerations such as these are subsequently addressed in step 112, an exemplary embodiment of which is shown in greater detail in FIG. 3. Skilled artisans will appreciate that any number of suitable techniques may be employed by step 104 to determine if a collision between the host and target vehicles or with some obstacle is likely, as the present method is not limited to any particular one. For example, the techniques disclosed in U.S. application Ser. Nos. 11/620,752 and Ser. No. 12/248,086, which are owned by the present assignee, may be employed here; the entire contents of those applications are hereby incorporated by reference.

Figure 3:
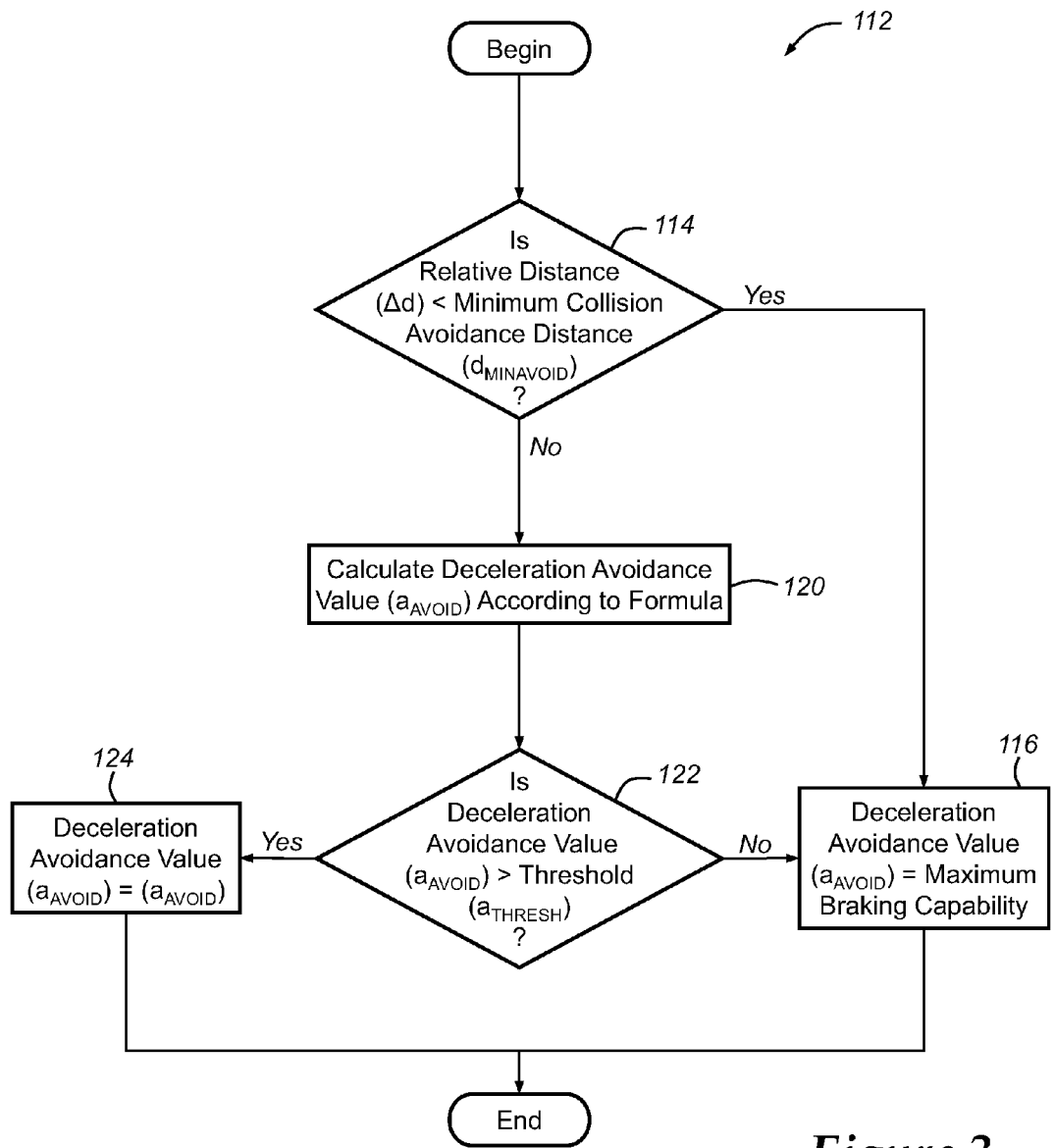
FIG. 3 is a flowchart illustrating an exemplary step for determining an avoidance deceleration value, and the step may be part of the exemplary method shown in FIG. 2.

Step 112 determines a deceleration avoidance value ($a_{AVOID}$) that is generally representative of the deceleration needed to prevent a collision between the host and target vehicles according to current operating conditions. The deceleration avoidance value ($a_{AVOID}$) may be subsequently used by the method to determine if and when an autonomous braking event should be engaged, as will be explained. Negative values for ($a_{AVOID}$) correspond to vehicle deceleration and are typically expected in situations where the method has determined that a collision is likely. With reference to FIG. 3, there is shown a more detailed illustration of a potential multi-step embodiment of step 112 for determining the deceleration avoidance value ($a_{AVOID}$).

Beginning with step 114, the method compares the relative distance (Δd) between the host and target vehicles (i.e., the current relative distance as provided by target sensor 30) to a minimum collision avoidance distance ($d_{MINAVOID}$), which is generally representative of the minimum amount of distance needed in order to avoid a collision under the current operating conditions. The minimum collision avoidance distance ($d_{MINAVOID}$) can vary based on a variety of factors, like current road surface conditions (e.g., paved roads, gravel roads, cobblestone roads, etc.), weather conditions (e.g., icy, snowy, wet road conditions), vehicle speed, vehicle acceleration, etc., and may be calculated according to any of a number of known techniques. If the current range or distance between the vehicles (Δd) is already less than the minimum collision avoidance distance ($d_{MINAVOID}$), then step 116 sets the deceleration avoidance value ($a_{AVOID}$) to an amount that corresponds with some maximum braking capability of the vehicle. Put differently, if the host vehicle is rapidly closing in on the target vehicle and the two vehicles are already so close to one another that it appears as if the host vehicle will not be able to avoid crashing into the target vehicle, then the method sets the deceleration avoidance value to its highest allowable setting. If the current distance between the vehicles (Δd) is greater than the minimum collision avoidance distance ($d_{MINAVOID}$), then it presently appears as if there is enough stopping distance and the method proceeds to step 120 so that a tailored or customized deceleration avoidance value ($a_{AVOID}$) can be determined.

One potential difference between the current method and others is that the current method uses dynamic brake commands throughout an autonomous braking event in order to actively control or manipulate the braking so that certain conditions, like a desired stopping distance ($d_{STOPPING}$), can be achieved or maintained. The desired stopping distance ($d_{STOPPING}$) generally corresponds to a desired or ideal stopping distance between the host and target vehicles which the method seeks to achieve during or at the end of an autonomous braking event. This is different than simply using a predetermined and static brake command for autonomous braking, as such commands cannot adjust to conditions as they change.

It should be appreciated that the minimum collision avoidance distance ($d_{MINAVOID}$) and/or the desired stopping distance ($d_{STOPPING}$) can be determined in a variety of ways. For example, control module 40 may maintain one or more lookup tables or other data structures that use vehicle and/or target readings as input (e.g., host vehicle velocity ($v_{HOST}$) or acceleration ($a_{HOST}$), target vehicle velocity ($v_{TAR}$) or acceleration ($a_{TAR}$), relative velocity ($\Delta v$) or acceleration ($\Delta a$), etc.) and provide a minimum collision avoidance distance ($d_{MINAVOID}$) and/or a desired stopping distance ($d_{STOPPING}$) as output. Such data structures may also take other conditions into account, such as those involving current road conditions, weather conditions, the performance or capability of the host vehicle brake system, etc. In a different embodiment, the method employs an algorithmic approach to determine the minimum collision avoidance distance ($d_{MINAVOID}$) and/or the desired stopping distance ($d_{STOPPING}$), as opposed to using a lookup table or the like. These and other suitable techniques may be used to determine such distances, including the exemplary techniques disclosed in U.S. patent application Ser. No. 13/032,694, which is owned by the present assignee and whose contents are hereby incorporated by reference.

Step 120 calculates a deceleration avoidance value ($a_{AVOID}$) for the host vehicle and may use the following formula to do so:

$$a_{AVOID}=((v_{HOST}-v_{TAR})+K)^2/2(\Delta d-d_{STOPPING})$$

The term $v_{HOST}$ is the host vehicle velocity, $v_{TAR}$ is the target vehicle velocity, K is a correction factor that takes into account the fact that vehicle brakes cannot brake instantaneously, $\Delta d$ is the relative distance or range between the host and target vehicles, and $d_{STOPPING}$ is the desired stopping distance, as described above. The term ($v_{HOST}-v_{TAR}$) is also referred to as a range rate ($\Delta v$), as it relates to the difference between the velocities of the two vehicles. Skilled artisans will appreciate that K can be dependent on the deceleration that is needed, the existing acceleration of the host vehicle ($a_{HOST}$) and/or the responsiveness or other characteristics of the host vehicle braking system, to cite a few possibilities. The correction factor K may have the same units as the range rate discussed above (e.g., km/hr, miles/hr, msec, etc.) and can be determined with one or more lookup tables or other data structures populated with empirically derived data gathered during testing, or it can be determined mathematically or algorithmically, to cite a few examples. According to the example above, the numerator in the formula is in units of (distance/time)$^2$ and the denominator is in units of distance, which results in a deceleration avoidance value ($a_{AVOID}$) in units of (distance/time$^2$) which corresponds to an acceleration or deceleration. A non-limiting range of exemplary deceleration avoidance values ($a_{AVOID}$) is 0-12 m/s$^2$, as this method may bring the host vehicle to a stop or a very slow speed, such as 0-20 km/hr; values outside of these potential ranges may be achieved as well.

Step 122 then compares the newly calculated deceleration avoidance value ($a_{AVOID}$) to a threshold ($a_{THRESH}$). As explained above, negative ($a_{AVOID}$) values correspond to decelerations and positive ($a_{AVOID}$) values correspond to accelerations, thus, in the following description if an ($a_{AVOID}$) value is less than a threshold ($a_{THRESH}$), then the ($a_{AVOID}$) value represents a greater or more aggressive deceleration and vice-versa. According to the exemplary embodiment shown in FIG. 3, if the deceleration avoidance value ($a_{AVOID}$) is greater than the threshold ($a_{THRESH}$) (i.e., if the calculated ($a_{AVOID}$) involves a less aggressive deceleration than ($a_{THRESH}$)), then step 124 may set $a_{AVOID}$ to the value calculated above (i.e., leave it unchanged). If, on the other hand, the deceleration avoidance value ($a_{AVOID}$) is less than the threshold ($a_{THRESH}$) (i.e., if ($a_{AVOID}$) involves a more aggressive deceleration than ($a_{THRESH}$)), then the method may proceed to step 116 so that the deceleration avoidance value ($a_{AVOID}$) can be set to the maximum braking capability. The threshold ($a_{THRESH}$) used in this step is calibratable and can be automatically changed by the method, by the operator, or by some other source.

Step 122 may consider a number of other criteria in addition to those described above. For instance, it is possible for the comparison in step 122 to have a temporal component such that the step determines if the deceleration avoidance value ($a_{AVOID}$) has been greater than the threshold ($a_{THRESH}$) for a certain amount of time. This feature may avoid temporary or momentary scenarios that could otherwise throw off the outcome of the method. In another example, step 122 may determine if the deceleration avoidance value ($a_{AVOID}$) is greater than zero and, if so, then the method may set ($a_{AVOID}$) to zero or some other nominal value, as the target vehicle may be currently pulling away from the host vehicle so that host vehicle deceleration is not necessary. Skilled artisans will appreciate that it may be undesirable to have the host vehicle actually accelerate in an autonomous braking mode, thus, the reason for setting ($a_{AVOID}$) to zero instead of a positive number, which would correspond to an actual acceleration.

At this point, a deceleration avoidance value ($a_{AVOID}$) has been determined and the description of the method turns back to FIG. 2. Step 144 may use the deceleration avoidance value ($a_{AVOID}$) to determine whether or not the host vehicle should be engaged in an autonomous braking event, and may do so in a variety of ways. Those skilled in the art will appreciate that there are myriad factors that may influence this determination, and that any number of which may be used here. The term "autonomous braking event," as used herein, broadly includes any braking event or action that is automatically taken by a host vehicle, without intervention on the part of the driver, in order to avoid and/or mitigate a collision with a target vehicle. In one embodiment, step 144 compares the previously-calculated deceleration avoidance value ($a_{AVOID}$) to some threshold in order to decide if autonomous braking should be initiated. If ($a_{AVOID}$) calls for a more aggressive deceleration than the threshold (in the example above, this corresponds to a more negative number), then the autonomous braking event should be engaged. Other factors that may also be considered by step 144 include the expected time or distance to impact, the behavioral traits of the driver (e.g., if they are paying attention), weather conditions (e.g., if the vehicle is on wet, snowy or icy roads), road conditions and features (e.g., if the vehicle is approaching a sharp bend or object in the road), vehicle readings (e.g., is the host vehicle already braking or involved in significant turn), target readings, etc. Depending on the outcome of step 144, the method may reset a counter and end or start over if it determines that an autonomous braking event is not currently appropriate, or the method may proceed to step 148.

Step 148 may evaluate a counter or other variable before the method actually sends dynamic brake commands for an autonomous braking event. It is possible for this check to be bundled or otherwise included within steps 112 and/or 144 so that the counter is taken into account when deciding whether or not autonomous braking is appropriate. In doing so, the method determines if this is the first time that a request for autonomous braking has been made (counter=0) or if the conditions supporting autonomous braking have existed for several iterations or cycles. Such a check may reduce the possibility of sensor error or sensor noise triggering an autonomous braking event, which could certainly alarm the driver if it was implemented unnecessarily. If the counter value is greater than zero, then the method proceeds to step 152; otherwise, method 100 proceeds to step 156. Of course, counter thresholds other than zero may be used instead (e.g., 2, 5, 10, 25, etc.).

At step 152, the method checks if there are any other conditions that may make an autonomous braking event undesirable or inappropriate under the current circumstances. In a way, this step may act as a final check before initiating a closed-loop autonomous braking event. Some potential examples of conditions that may weigh against engaging in autonomous braking include: behavior of target vehicle 14 (e.g., if the target vehicle changes lanes or suddenly accelerates such that a collision is less likely), behavior of host vehicle 12 (e.g., if the driver is already braking or engaging in evasive maneuvers), or braking performance of the host vehicle (e.g., if the host vehicle brakes and/or the road surface is more "grippy" or responsive than expected), to cite a few. If there are one or more conditions weighing against or disfavoring engagement of an autonomous braking event, then the method may reset the counter value, step 164, and terminate or start over for continued monitoring. However, if there are no other conditions preventing host vehicle 12 from engaging in autonomous braking, then step 168 can generate and/or send the appropriate command signals for an autonomous braking event.

Step 168 may utilize any number of different techniques to initiate, maintain and/or otherwise engage in an autonomous braking event. In one instance, control module 40 generates and sends one or more dynamic brake command signals to braking devices 50 so that the host vehicle is decelerated according to the deceleration avoidance value ($a_{AVOID}$) determined above. Each time that the method cycles through another iteration (e.g., every 20-80 mS or so), the deceleration avoidance value ($a_{AVOID}$) may be modified or adjusted somewhat according to the formula provided in step 120; this, in turn, enables the method to manipulate the autonomous braking throughout the event, as opposed to simply braking the vehicle according to a static and predetermined deceleration that may be too conservative or not conservative enough. If, during the next iteration, steps 114 or 118 determine that the conditions have changed and that braking up to and including the maximum braking capabilities of the vehicle is warranted, such a change can be made.

According to one embodiment, method 100 seeks to maintain a certain relative distance ($\Delta d$) and/or relative velocity ($\Delta v$) between host vehicle 12 and target vehicle 14. This could entail, for example, monitoring the various vehicle and/or target readings and adjusting the deceleration avoidance value ($a_{AVOID}$)—and hence, the dynamic brake commands—up or down so that a certain relative distance ($\Delta d$) and/or relative velocity ($\Delta v$) is maintained between the two vehicles. This dynamic process of monitoring and adjusting brake commands may continue for as long as is appropriate or as long as the autonomous braking event is needed. If at any point, the relative distance ($\Delta d$) or relative velocity ($\Delta v$) between the host and target vehicles is large enough that autonomous braking is no longer needed, then the method may gradually ramp down the brake commands or disengage the autonomous braking event so that the driver can manually take over. Other features and options are certainly available.

Going back to step 148, if the counter value is equal to zero (or any other suitable threshold, as the step is not limited to a threshold of zero), then the method proceeds to step 156 to see if there are any conditions not already considered that may support an autonomous braking event. In a way, step 156 is the counterpart to step 152, but instead of looking for conditions that weigh against autonomous braking, this step looks for factors that weigh in favor of autonomous braking. Consider the example where target vehicle 14 is decelerating much more quickly than host vehicle 12 such that the relative velocity reading ($\Delta v$) is increasing rapidly; this suggests an increased relative acceleration ($\Delta a$). Method 100 may determine that instead of waiting for one or more iterations so that the counter can reach its threshold, it would be better to initiate autonomous braking now. Other conditions or factors, such as target vehicle behavior may certainly be considered by step 156 as well. If step 156 determines that an autonomous braking event is desirable or warranted, then the method may proceed to step 168 to engage in an autonomous braking event, as already explained above. Otherwise, step 160 increments the counter value and the method continues.

It is possible for method 100 to stop or terminate at any point within the sequence of steps if the method determines that the autonomous braking no longer needs to be engaged. For example, if the target vehicle begins to accelerate or pull away from the host vehicle, then the method may automatically detect this situation and cancel any autonomous braking event currently underway. Other associated features may be employed, such as requiring the abatement of autonomous braking conditions to persist over a period of time or a number of cycles so that momentary changes do not inadvertently cancel any otherwise appropriate autonomous braking event.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. It is also possible for the method to control collision avoidance system 10 in order to address an object in the road (e.g., fallen tree limb, debris, etc.), as opposed to a target vehicle. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for use with a collision avoidance system installed on a host vehicle, comprising the steps of:
   (a) receiving target readings from a target sensor installed on the host vehicle;
   (b) using the target readings to determine if the host vehicle is likely to collide with a target vehicle; and
   (c) if the host vehicle is likely to collide with the target vehicle, then engaging one or more braking devices in an autonomous braking event that includes adjusting or modifying dynamic brake commands so that braking of the host vehicle is actively controlled throughout the autonomous braking event, wherein a deceleration avoidance value ($a_{AVOID}$) representative of a deceleration needed to prevent a collision between the host and target vehicles is used to generate the dynamic brake commands, and the dynamic brake commands are designed to achieve a relative distance ($\Delta d$) between the host and target vehicles at the end of the autonomous braking event.

2. The method of claim 1, wherein step (a) further comprises receiving a target vehicle acceleration value ($a_{TAR}$), a relative velocity reading ($\Delta v$), and a relative distance reading ($\Delta d$) from the target sensor; and step (b) further comprises using the target vehicle acceleration value ($a_{TAR}$), the relative velocity reading ($\Delta v$), and the relative distance reading ($\Delta d$) to determine if the host vehicle is likely to collide with the target vehicle.

3. The method of claim 1, wherein step (c) further comprises comparing a relative distance ($\Delta d$) between the host and target vehicles to a minimum collision avoidance distance ($d_{MINAVOID}$), and setting the deceleration avoidance value ($a_{AVOID}$) to a maximum braking capability when the relative distance ($\Delta d$) is less than the minimum collision avoidance distance ($d_{MINAVOID}$).

4. The method of claim 1, wherein step (c) further comprises determining the deceleration avoidance value ($a_{AVOID}$) with a formula that includes a term ($v_{HOST}-v_{TAR}$), which is related to a difference between the velocities of the host and target vehicles.

5. The method of claim 4, wherein step (c) further comprises determining the deceleration avoidance value ($a_{AVOID}$) with a formula that includes a term $((v_{HOST}-v_{TAR})+K)^2$, which is related to the difference between the velocities of the host and target vehicles, as well as a correction value K that takes into account the fact that vehicle brakes cannot brake instantaneously.

6. The method of claim 1, wherein step (c) further comprises determining the deceleration avoidance value ($a_{AVOID}$) with a formula that includes a term ($\Delta d - d_{STOPPING}$), which is related to a difference between a relative distance between the host and target vehicles and a desired stopping distance.

7. The method of claim 1, wherein step (c) further comprises determining the deceleration avoidance value ($a_{AVOID}$) with the following formula:

$$a_{AVOID} = ((v_{HOST}-v_{TAR})+K)^2 / 2(\Delta d - d_{STOPPING})$$

wherein $v_{HOST}$ is a host vehicle velocity, $v_{TAR}$ is a target vehicle velocity, K is a correction factor, $\Delta d$ is a relative distance between the host and target vehicles, and $d_{STOPPING}$ is a desired stopping distance.

8. The method of claim 1, wherein step (c) further comprises setting the deceleration avoidance value ($a_{AVOID}$) to zero if the deceleration avoidance value ($a_{AVOID}$) is a positive number representing an actual acceleration.

9. The method of claim 1, wherein step (c) further comprises comparing the deceleration avoidance value ($a_{AVOID}$) to a threshold ($a_{THRESH}$), and setting the deceleration avoidance value ($a_{AVOID}$) to a maximum braking capability if the deceleration avoidance value ($a_{AVOID}$) is a more aggressive deceleration than the threshold ($a_{THRESH}$).

10. The method of claim 1, wherein step (c) further comprises using the deceleration avoidance value ($a_{AVOID}$) to determine if the host vehicle should engage in the autonomous braking event.

11. The method of claim 10, wherein step (c) further comprises comparing the deceleration avoidance value ($a_{AVOID}$) to a threshold, and engaging in the autonomous braking event if the deceleration avoidance value ($a_{AVOID}$) is a more aggressive deceleration than the threshold.

12. The method of claim 1, wherein step (c) further comprises sending dynamic brake commands to one or more braking devices so that the host vehicle decelerates according to different decelerations throughout the autonomous braking event.

13. The method of claim 1, wherein step (c) further comprises sending dynamic brake commands to one or more braking devices so that the host vehicle maintains a relative distance ($\Delta d$) and a relative velocity ($\Delta v$) between the host and target vehicles for at least a portion of the autonomous braking event.

14. The method of claim 1, wherein step (c) further comprises disengaging in the autonomous braking event if a relative distance ($\Delta d$) or a relative velocity ($\Delta v$) between the host and target vehicles indicates that the autonomous braking event is no longer needed.

15. A method for use with a collision avoidance system installed on a host vehicle, comprising the steps of:
   (a) receiving target readings from a target sensor installed on the host vehicle, the target readings include a relative distance ($\Delta d$) between the host and target vehicles;
   (b) using the target readings to determine a deceleration avoidance value ($a_{AVOID}$) that is generally representative of a deceleration needed to prevent a collision between the host and target vehicles, wherein determining the deceleration avoidance value ($a_{AVOID}$) includes comparing the relative distance ($\Delta d$) to a minimum collision avoidance distance ($d_{MINAVOID}$) and setting the deceleration avoidance value ($a_{AVOID}$) to a maximum braking capability when the relative distance ($\Delta d$) is less than the minimum collision avoidance distance ($d_{MINAVOID}$); and
   (c) using the deceleration avoidance value ($a_{AVOID}$) to generate dynamic brake commands that adjust or modify a deceleration of the host vehicle throughout an autonomous braking event.

16. A collision avoidance system installed on a host vehicle, comprising:
   a target sensor configured to provide target readings;
   one or more braking device(s) configured to receive command signals and to decelerate the host vehicle accordingly; and
   a control module coupled to the target sensor for receiving the target readings and coupled to the braking device(s) for providing the command signals, wherein the control module is configured to provide dynamic command signals based on deceleration avoidance values ($a_{AVOID}$) to the braking device(s) so that the deceleration of the host vehicle is actively adjusted or modified throughout an autonomous braking event, and the dynamic brake commands are designed to achieve a relative distance ($\Delta d$) between the host and target vehicles at the end of the autonomous braking event.

* * * * *